June 8, 1943.   M. RUBINOFF   2,321,519
DRIP CATCHING PLATE FOR INDIVIDUAL PORTIONS OF ICE CREAM
Filed May 5, 1941

INVENTOR
Mark Rubinoff
BY
ATTORNEY

Patented June 8, 1943

2,321,519

UNITED STATES PATENT OFFICE 2,321,519

DRIP CATCHING PLATE FOR INDIVIDUAL PORTIONS OF ICE CREAM

Mark Rubinoff, New York, N. Y.

Application May 5, 1941, Serial No. 392,012

3 Claims. (Cl. 229—1.5)

This invention relates to means for serving ice cream in individual portions and more particularly refers to improvements in devices adapted to catch drippings from ice cream served in any of the forms now currently in use at ice cream stands, such as ice cream cones, cups, sticks, bricks, and the like.

When ice cream is bought in any one of the forms mentioned for immediate consumption, it is usually served in cones or in paper cups, or mounted on a stick; in other words, the ice cream is sold in a form adapted to be held in one hand while the other hand holds a paper or wooden spoon which is usually supplied with each portion, without the hand coming into direct contact with the ice cream.

However, ice cream consumed in this manner frequently begins to melt and drip from the edges of the holder and may fall on clothing or on the floor with unpleasant consequences.

The main object of the present invention is to provide a plate, which may be made of paper or fiber board, adapted to be mounted upon or to support the ice cream holder or the ice cream itself when in brick form, said plate being wide enough to extend around the ice cream holder a distance sufficient to catch whatever drippings may fall from the ice cream.

Another object is to provide a device of the character specified so designed that, besides being adapted to catch the ice cream drippings, it is also adapted to act as a support for the ice cream or the ice cream holder.

A further object is to provide a drip catching device for ice cream, made of paper, wood fiber board, or other similar inexpensive material, formed in a special shape so as to be adapted for use as a drip catching holder for practically any one of the forms in which ice cream is now popularly sold.

A still further object is to provide a device of the character specified pressed into a form lending itself for easy nesting and packing for convenience in shipping, storing and handling.

Other objects and advantages of the present invention will more fully appear as the description proceeds and will be set forth and claimed in the appended claims.

My invention is illustrated by way of example in the accompanying drawing, in which.

Figure 1:
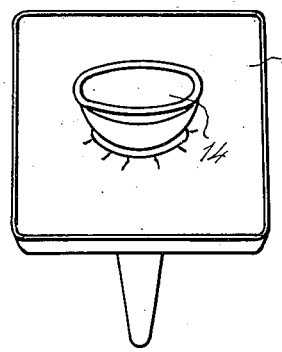
Fig. 1 is a view in perspective of an ice cream cone equipped with a drip catching plate embodying my invention in one of its forms.
Figure 2:
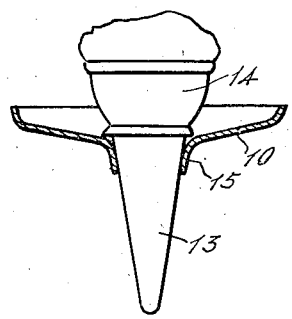
Fig. 2 is a view in elevation of the same with the drip catching plate shown in section.
Figure 3:
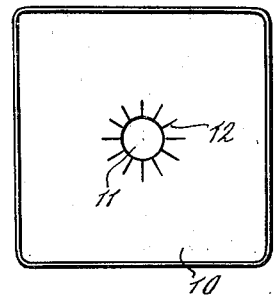
Fig. 3 is a plan view of the drip catching plate shown in Figs. 1 and 2.
Figure 4:
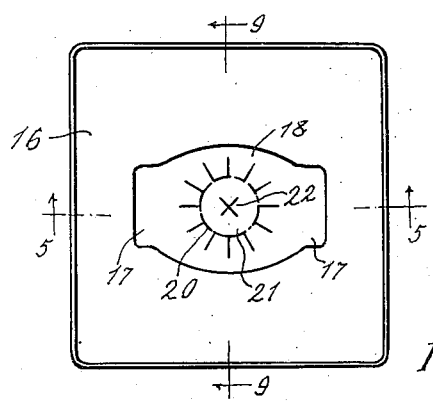
Fig. 4 is a plan view of a plate embodying my invention in a form adapting it for universal use.

The form of embodiment shown in Figs. 1 to 3 is particularly adapted for use in connection with ice cream cones, the device serving exclusively as a drip catching plate, the user holding the stem portion of the cone in one hand in the usual manner.

As in said Figs. 1 to 3, the device consists of a relatively shallow cupped plate 10, made of pressed paper or board, provided with a central opening 11, through which the stem portion of the cone can be inserted. Preferably a circumferential series of slits 12 radially extending from said opening are also cut through the material so that when stem 13 of the ice cream cone 14 is forced through the opening the portions of the paper between the slits will form tongues 15, snugly embracing the cone and holding the plate in position, as shown in Figs. 1 and 2.

In the embodiment shown in the remaining figures the device consists of a cupped plate 16, made of wood fiber board or other similar material, adapted for relatively deep embossing or pressing. Wood fiber board, a material extensively used for the manufacture of pie plates, for instance, when impregnated with water can be subjected to relatively deep embossing under the press, and since it is relatively inexpensive and rigid when it is subsequently dried, it is well adapted for the manufacture of my improved drip catching plate. For very deep embossing it is also possible to press the plates out of pulp by means of heated dies, forming and drying the plates in one operation.

The plate 16 is made with a relatively deep central depression, having a composite outline formed by a rectangular portion 17—17, intersected by a central portion 18 having a circular or oval outline.

The bottom 19 of the depression is formed with a central circular line 20, weakened by scoring, or partly by scoring and partly by slitting, said line 20 defining a disk 21, which may be easily forced loose by pressing against it, so as to form an opening through which the stem portion of an ice cream cone can be inserted. In addition, the center of said disk is formed with a slit or slits 22, through which the stick of a portion of ice cream on a stick can be inserted.

Figure 6:
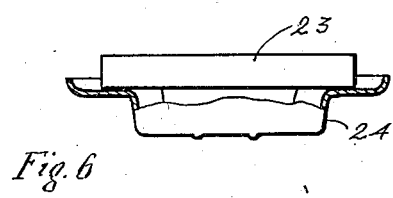
Fig. 6 is a view similar to Fig. 5 showing the plate used as a holder for ice cream in brick form.

The various uses to which this universal type of plate can be put are illustrated in Figs. 6 to 9. In Fig. 6 the plate portion proper of the device is used as a tray on which a brick of ice cream 23 is placed, the wall 24 of the depression depending from the plate portion thereof, providing a convenient means for holding the device in one hand while the other hand holds the spoon.

Figure 7:
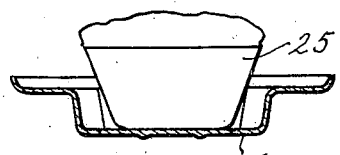
Fig. 7 is a similar view showing the plate used as a holder for ice cream served in a paper cup.
Figure 5:
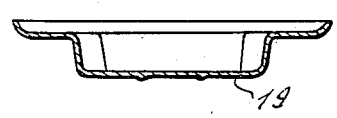
Fig. 5 is a vertical view thereof through line 5—5 of Fig. 4.

In Fig. 7 the central portion 18 of the depression is used for holding ice cream in a paper cup 25, the bottom of said cup resting upon the bottom 19 of the depression, the wall of the depression also in this case providing a convenient means for holding the device in one hand.

Figure 8:
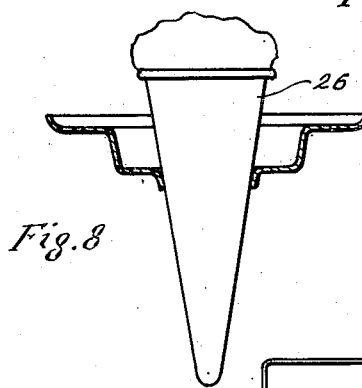
Fig. 8 is a similar view showing the plate as a holder for an ice cream cone.

In Fig. 8 the central disk 21 has been forced off and the stem portion of an ice cream cone 26 has been inserted through the resulting opening, the body of the ice cream cone being held against tilting by the rounded edges of the depression at 18.

Figure 9:
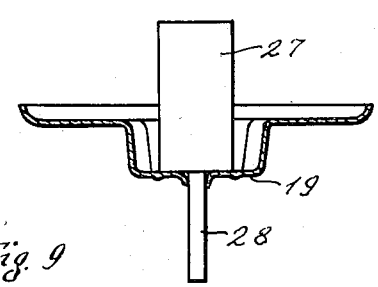
Fig. 9 is a vertical section of said plate through line 9—9 of Fig. 4, showing the manner in which the plate can be used in connection with a portion of ice cream mounted on a stick.

In Fig. 9 the device is used in connection with a rectangular block of ice cream 27, mounted on a stick 28, the stick 28 having been forced through the slits 22 of disk 21 and the ice cream resting upon the bottom 19 of the depression.

Figure 10:
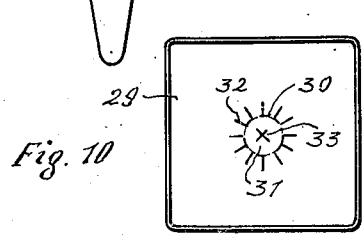
Fig. 10 is a plan view of a drip catching plate similar to that shown in Figs. 1 to 3, embodying some of the features shown in plate of Figs. 4 to 9.

In Fig. 10 I show a plate 29, similar to that shown in Fig. 3, with the difference that instead of having a central opening the plate is formed with a central circular line 30 weakened by scoring, or partly by scoring and partly by slitting, making it possible to readily detach the disk 31 defined thereby when the plate is to be used in connection with an ice cream cone.

The plate is furthermore preferably provided with a circumferential series of slits 32, radially extending from the circular line 30, defining tongues similar to tongues 15, shown in Fig. 2, snugly embracing the stem of the cone when said stem is inserted through the opening left by the removal of disk 31. In addition, the disk 31 is provided with one or two cross slits, as shown at 33, making it possible to insert therethrough the stick of an ice cream block mounted on a stick, as explained in connection with Fig. 9.

A plate, such as shown in Fig. 10, also presents the advantage over that shown in Fig. 3 of being adapted to hold ice cream in brick form, as shown in Fig. 6, because the slits cut through the body of the plate are virtually leak proof if left undisturbed.

Besides providing a convenient and sanitary accessory for the sale and consumption of ice cream, my device affords a convenient means for carrying advertisements or other printed or decorative matter, aiding in reducing or nullifying the cost of providing it to the consumer in addition to the ice cream.

My invention can be carried into practice in ways different from those shown, without departing from the inventive idea. The drawing should, therefore, be understood as being intended for illustrative purposes only and not in a limiting sense.

I, accordingly, reserve the right to carry my invention into practice in all those ways and manners which may enter, fairly, into the scope of the appended claims.

I claim:

1. A drip catching device for use in combination with an ice cream holder of the character described, comprising a plate element having a central depression forming a pocket adapted to receive an ice cream holder in cup form, said element extending laterally of and all around said holder a distance sufficient to enable said element to catch all drippings falling from ice cream carried by said holder, the bottom of said pocket having a central disk portion defined by a weakened circular line facilitating the severing of said disk portion from said bottom.

2. A drip catching device for use in combination with an ice cream holder of the character described, comprising a plate element having a central depression forming a pocket adapted to receive an ice cream holder in cup form, said element extending laterally of and all around said holder a distance sufficient to enable said element to catch all drippings falling from ice cream carried by said holder, the center of the bottom of said pocket being slitted to permit the insertion of a stick therethrough.

3. A drip catching device for use in combination with an ice cream holder of the character described, comprising a plate element having a central depression forming a pocket adapted to receive an ice cream holder in cup form, said element extending laterally of and all around said holder a distance sufficient to enable said element to catch all drippings falling from ice cream carried by said holder, the bottom of said pocket having a central disk portion defined by a weakened circular line facilitating the severing of said disk portion from said bottom, the center of said disk portion being slitted to permit the insertion of a stick therethrough.

MARK RUBINOFF.